United States Patent
Tsun et al.

(10) Patent No.: US 6,708,224 B1
(45) Date of Patent: Mar. 16, 2004

(54) METHODS, SYSTEMS AND COMPUTER PROGRAM PRODUCTS FOR COORDINATION OF OPERATIONS FOR INTERRELATED TASKS

(75) Inventors: William Tsun, Cary, NC (US); Vikas Chandra, Cary, NC (US); John Lee Wood, Raleigh, NC (US); Peter James Schwaller, Raleigh, NC (US)

(73) Assignee: NetIQ Corporation, San Jose, CA (US)

( * ) Notice: Subject to any disclaimer, the term of this patent is extended or adjusted under 35 U.S.C. 154(b) by 0 days.

(21) Appl. No.: 09/234,085

(22) Filed: Jan. 19, 1999

(51) Int. Cl.7 .................................................. G06F 9/46
(52) U.S. Cl. ...................................... 709/316; 717/127
(58) Field of Search ................................ 709/100–108, 709/316; 707/103; 717/124–131

(56) References Cited

U.S. PATENT DOCUMENTS

| | | |
|---|---|---|
| 4,545,011 A | 10/1985 | Lyon et al. |
| 5,049,873 A | 9/1991 | Robins et al. |
| 5,107,450 A | 4/1992 | Lawrenz |
| 5,257,393 A | 10/1993 | Miller |
| 5,572,640 A | 11/1996 | Schettler |
| 5,634,009 A | 5/1997 | Iddon et al. |
| 5,655,081 A | 8/1997 | Bonnell et al. ........ 395/200.32 |
| 5,706,436 A | 1/1998 | Lewis et al. |
| 5,732,213 A | 3/1998 | Gessel et al. |
| 5,764,915 A | 6/1998 | Heimsoth et al. |
| 5,809,286 A | 9/1998 | McLain, Jr. et al. |
| 5,829,001 A | 10/1998 | Li et al. ........................ 707/10 |
| 5,978,594 A | 11/1999 | Bonnell et al. ............. 395/837 |
| 5,986,653 A | 11/1999 | Phathayakorn et al. ..... 345/348 |
| 5,999,178 A | 12/1999 | Hwang et al. .............. 345/348 |
| 6,078,324 A | 6/2000 | Phathayakorn et al. ..... 345/348 |

OTHER PUBLICATIONS

Butterfield, "System Performance Monitor/2 Reference," International Business Machines Corporation (1991).

Brochure, "The DA–30® family of internetwork analyzers", Wandel & Goltermann (1994).

Brochure, "DA–30C benchmarking Capabilities", Wandel & Goltermann (1995).

(List continued on next page.)

*Primary Examiner*—Zarni Maung
*Assistant Examiner*—George L. Opie
(74) *Attorney, Agent, or Firm*—Myers Bigel Sibley & Sajovec

(57) ABSTRACT

Methods, systems and computer program products are provided which coordinate operations for a plurality of interrelated tasks executing on a computer using actual state objects and desired state objects. For each event including coordination between two of the plurality of interrelated tasks, a first (or initiator) task initiates operations by a second (or executor) task to carry out a desired sequence of operations. The initiator task sets a desired state object to the desired state and submits a request to the executor task. The executor task, in turn, operates on the request in order to update an actual state object to the desired state stored in the desired state object by the initiator task. Write control over the desired state object is therefore granted to the initiator task while write control over the actual state object is granted to the executor task. A transitional state may be provided for the actual state object during the time period while the executor task is carrying out the operations necessary to change from the actual state to the desired state. Different restrictions on operations related to the associated object may be provided while the actual state object is in the transitional state. Also provided are systems, methods and computer program products for monitoring a task executing on a computer which utilizes a work in process queue and a work pending queue and restarting the task if it is not executing properly.

17 Claims, 7 Drawing Sheets

OTHER PUBLICATIONS

Brochure, "Vital Signs VisionNet", BlueLine Software, Inc., including inserts "LAN Agent", "VTAM Agnet", "NCPL Agent" (1995).

Brochure, Vital Signs VisionNet (1995).

Brochure, "SmartBits: Switch testing in its simplest form . . . ", Netcom Systems, Inc. (1995).

Brochure, "EconNET™: Networked Applications Performance Mangement", Compuware Corporation (1995).

Brochure, Hot off the Shelf: Application Mangement, Data Communications (Jan. 1996).

Brochure, "10 Reasons Why You Need an Applications View of Your Network," Compuware Corporation (Jan. 9, 1996).

Brochure, "Network General Corporation: Products and Services", Network General Corporation (1995).

Brochure, "ProView: Network Performance Management Systems", Network Telemetrics, Inc. (1995).

Brochure, "Managing the User Environment across Integrated SNA and IP Networks", Network Telemetrics, Inc. (1995).

Brochure, "Using Performance Baselines to Manage Network Service Levels", Williamson, W., Network Telemetrics, Inc. (1995).

Brochure, "Standard Based Distributed Diagnostics for Enterprise Networks", Froniter Software Development, Inc. (Sep. 1995).

Brochure, "QualityWorks—The most complete client/server testing solution you can buy", Segue Software Products (1996).

Brochure, "LANQuest: Net/WRx", LANQuest (Sep. 12, 1995).

Brochure, "Netbench(R) 3.01 Frequently Asked Questions", Ziff–Davis Benchmark Operation.

Brochure, EcoNET: The View from the Top, Hurwitz Consulting Group, Inc. (1995).

Brochre, "Visual On Ram™ Managed Internet Access Device" (1/96).

Brochure, "FirstSense".

Brochure "NextPoint".

Brochure, "NextPoint Frame Relay™".

Brochure, "VeriServ™," Response Networks, Inc.

Brochure, "Service Management Architecture Product Overview," Jyra Research, Inc.

Brochure, "Optimal Application Expert™" Optical Networks Corp. (1997).

Article, Sobel, Ken; *"Compuware's EcoSCOPE"; Hurwitz Group, Inc.* (9/97).

METHODS, SYSTEMS AND COMPUTER PROGRAM PRODUCTS FOR COORDINATION OF OPERATIONS FOR INTERRELATED TASKS

FIELD OF THE INVENTION

The present invention, generally, relates to coordination of tasks, and, more particularly, to systems, methods and computer program products for coordination of tasks in a computer environment.

BACKGROUND OF THE INVENTION

Increases in the application of computers throughout many differing environments has led to a wide range of usage of computers and, more particularly, to the usage of computers supporting multi-tasking. While the various concurrently executing tasks in a multi-tasking environment may be operating independently without the need for any interaction, problems may arise in coordination where the various concurrently executing tasks need to interact in order to operate for their intended purpose. Furthermore, the coordination challenge may be increased where user interaction with the tasks during execution is required.

In an effort to reduce the complexity of applications having user input and present a more "user friendly" computing environment, graphic user interfaces (GUIs) have been developed. GUIs are believed to present an easier to understand interface to an application's users and, thus, reduce the intimidation of an application. GUIs typically include multiple windows in which information is presented and user input obtained. Each of these windows may interact with one or more applications and may share data with one or more applications or other windows. However, development of these multiple window interfaces may be complex as interactions between the windows may be limited by the underlying application or by particular sequences of events which may be dictated by the windows.

An example of an application environment where multiple tasks may require interaction is where multiple users share data across a computer network. Such an environment may provide convenience in that it allows a central repository of data but may add further complications in managing this data as multiple users may desire to access such data simultaneously or concurrently. Thus, applications and, in particular, user interfaces for applications may have increased complexity associated with them to manage the interaction of users with a shared network resource, such as a database, to coordinate users' interactions with the shared resource and maintain integrity of the shared resource.

Further problems may be created in a networked environment where user input may specify changes to a state of remote devices connected over a network. The problem of coordination of tasks may be complicated by introducing a plurality of unsynchronized systems, each of which may be a multi-tasking environment, which must be coordinated. Typically, coordination is provided by communications over a computer network, thereby introducing additional delay in the time between user input through, for example, a GUI, and updating of the state of individual multi-tasking environments. An example of such an environment is a distributed network management tool with tasks executing on various nodes of the computer network to be managed under the direction of a console node subject to user input to define test protocols for network management.

SUMMARY OF THE INVENTION

Accordingly, it is an object of the present invention to provide methods, systems and computer program products which may provide for coordination of operations between interrelated tasks in a multi-tasking environment.

It is a further object of the present invention to provide such methods, systems and computer program products which can process user inputs affecting the state of network resources and/or affecting the interaction between interrelated tasks.

These and other objects are provided by systems, methods and computer program products which coordinate operations for a plurality of interrelated tasks executing on a computer using actual state objects and desired state objects. For each event including coordination between two of the plurality of interrelated tasks, a first (or initiator) task initiates operations by a second (or executor) task to carry out a desired sequence of operations. The initiator task sets a desired state object to the desired state and submits a request to the executor task. The executor task, in turn, operates on the request in order to update an actual state object to the desired state stored in the desired state object by the initiator task. Write control over the desired state object is therefore granted to the initiator task while write control over the actual state object is granted to the executor task. The actual state object may represent a state of a remote device in which circumstance there may be a significant time delay between the point at which a request to change actual state is submitted and the time at which confirmation of the change is received. Therefore, a transitional state may be provided for the actual state object during the time period while the executor task is carrying out the operations necessary to change from the actual state to the desired state. Different restrictions on operations related to the associated object may be provided while the actual state object is in the transitional state.

Systems, methods and computer program products are also provided for monitoring a task executing on a computer which utilizes a work in process queue and a work pending queue. A watchdog task monitors an executing task to determine if any problems have been encountered and restarts the task if it is not executing properly. To allow clean restart, requests in the work in process queue are restarted from an initial start point. Alternatively, tasks from the work in process queue may be placed back in the work pending queue and the work in process queue is cleared after which execution of requests from the work pending queue are resumed.

In one embodiment of the present invention, a method is provided for coordination of operations for a plurality of interrelated tasks. A first one of the plurality of interrelated tasks sets a desired state object to a desired state and requests an update of an actual state object to the desired state. A second one of the plurality of interrelated tasks updates the actual state object responsive to the request to update the actual state object. The first one of the plurality of interrelated tasks has write access to the desired state object and does not have write access to the actual state object. The second one of the plurality of interrelated tasks has write access to the actual state object and does not have write access to the desired state object.

In another embodiment of the present invention, the desired state object and the actual state object each have an associated version number. Updating operations include receiving the request to update the actual state object to the desired state and reading the version number of the actual state object and the version number of the desired state object. The actual state object is set to the desired state if the version number of the actual state object is different from the version number of the desired state object. The version number of the actual state object is then set to the version number of the desired state object.

In a further embodiment of the present invention the second one of the plurality of interrelated tasks receives the request to update the actual state object to the desired state, reads the actual state object and the desired state object and sets the actual state object to the desired state. Setting operations for the actual state object may include setting the actual state object to a transitional state and then performing operations associated with changing from the actual state to the desired state. The actual state object is then set to the desired state. In one embodiment, operations for changing the actual state include communicating a request to change state to the desired state to a second device remote from the data processing system executing the first and second tasks. At least one of an error indication and a confirmation of state change is received from the second device. The actual state is set to the desired state if a confirmation of state change is received from the remote device.

In a further embodiment of the present invention, updates of an actual state object to the desired state are requested by placing a request in a work pending queue associated with the second one of the plurality of interrelated tasks.

In another embodiment of the present invention, a designation of a desired state of a first object is obtained from a first one of the plurality of interrelated tasks. A second one of the plurality of interrelated tasks is requested to update the first object to the desired state. The second one of the plurality of interrelated tasks updates the first object to the desired state responsive to the request to update the actual state. Updating operations include receiving the desired state, determining an actual state of the first object, and determining if the actual state is different from the desired state. The actual state is set to a transitional state if the actual state is different from the desired state. Operations associated with changing from the actual state to the desired state are then performed, after which the actual state is set to the desired state. The desired state may be selected from a plurality of possible desired states and the transitional state may be selected from a plurality of possible transitional states. The actual state is set to a selected one of the plurality of transitional states associated with an update from the actual state to the desired state.

In a further aspect of the present invention, methods are provided for monitoring a task executing on a data processing system, the task having an associated work in process queue and an associated work pending queue. The task is configured to properly execute requests which are terminated in progress and restarted from an initial start point. A watchdog task determines if the task is executing properly and restarts the task if it is not executing properly. Restarting is provided by placing requests in the work in process queue of the terminated task in the work pending queue and clearing the work in process queue. Execution by the task of requests from the work pending queue is then reinitiated.

While the present invention has been described primarily above with reference to method aspects, it is to be understood that systems and computer program products are also provided.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these functions can be implemented by special purpose hardware-based computer systems which perform the specified functions or steps, or combinations of special purpose hardware and computer instructions.

Figure 1:
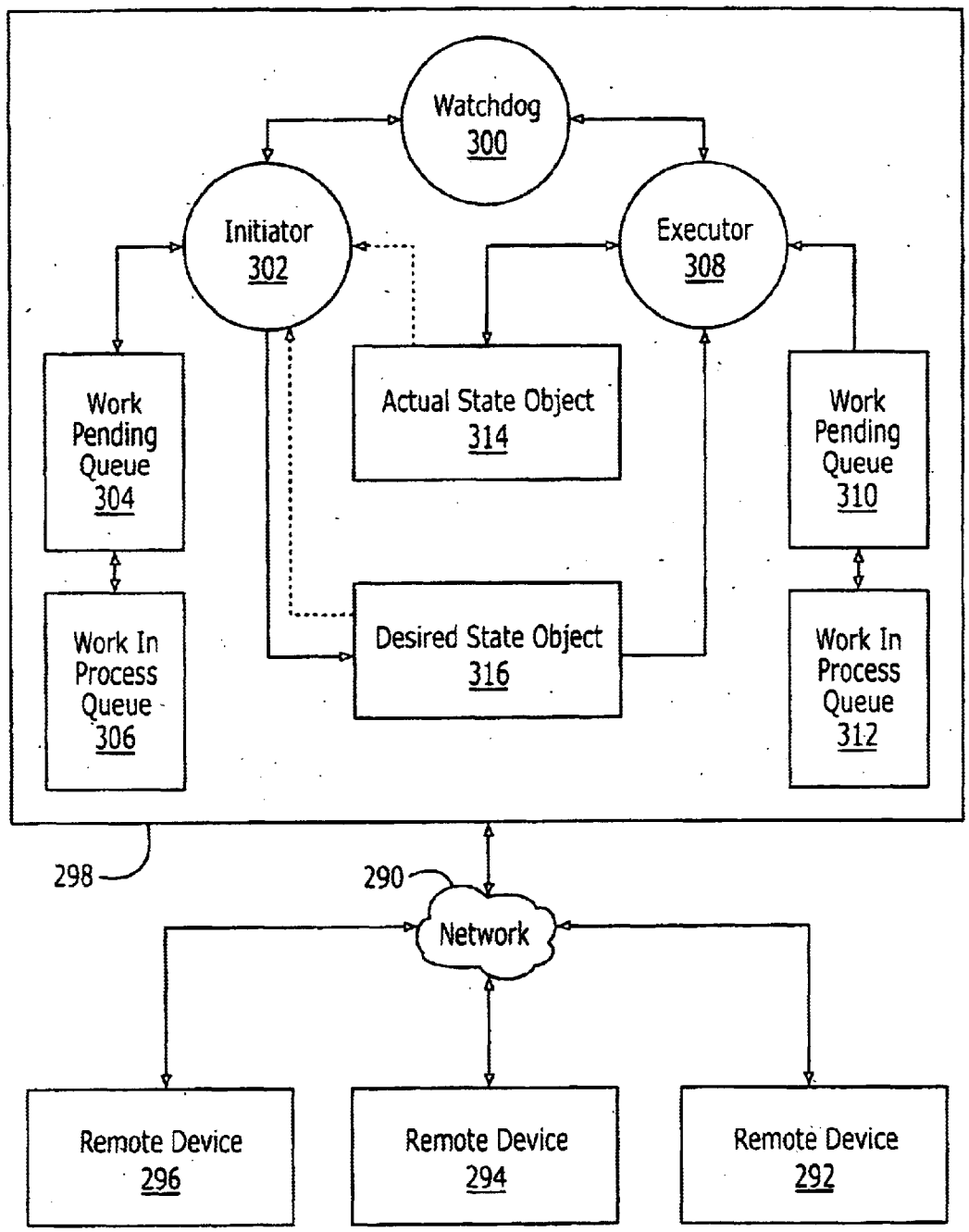
FIG. 1 schematically illustrates an embodiment of the present invention in a hardware and software environment in which the present invention can operate.

Referring now to FIG. 1, a hardware and software environment in which the present invention can operate will now be described. As shown in FIG. 1, the present invention includes methods, systems and computer program products for coordination of operations of interrelated tasks and for monitoring and restarting tasks executing on a computer. As used herein, the term "task" refers to a program or a group of programs executing on a computer (or other processing means) or a plurality of computers connected over a communications network or link. A task may include, for example, a main code thread which, in turn, initiates additional code threads to process individual instances of requests. A task may be machine level code executing on a custom integrated circuit device or code stored in a storage means accessible and executed by a processor means such as a microprocessor.

The benefits of the present invention may be obtained within a stand alone environment of a first device 298 such as a multi-tasking computer device and may further be beneficially applied in a network environment where the first device 298 communicates over a network 290 with remote devices 292, 294, 296. While illustrated in FIG. 1 as having the multiple tasks to be coordinated all resident on the first device 298, the remote devices 292, 294, 296 may also be computers which may act as multi-tasking environments. The present invention may further be applied, however, in environments where remote devices 292, 294, 296 need not be multi-tasking devices and indeed, need not be computers so long as they are able to communicate over network 290 with the first device 298. For example, the remote devices 292, 294, 296 in a factory environment may be actuator or controllable machine devices which are controlled by a central control system operating as first device 298 and executing a plurality of interrelated tasks to carry out control functions in the factory environment. In the particular embodiment of an implementation of the present invention which will be described further herein, the first device 298 is a console node for scheduled network performance testing system with remote device 292, 294, 296 are endpoint nodes installed on various other computers connected to the network 290 so as to allow scheduled testing of connections on network 290 between the remote devices 292, 294, 296.

As will be understood by those having skill in the art, a computer communications network 290 may be comprised of a plurality of separate link physical communication networks which, using a protocol such as the Internet protocol (IP), may appear to be a single seamless communications network to user application programs. A network may further include a bus that links various devices or other interface means that can link various executing tasks and resources available to the tasks.

The first device 298 as illustrated in FIG. 1 includes an initiator 302 and an executor 308 each of which may be a task executing in a multi-tasking environment on a computer 298. The particulars of establishing programs which execute on computers in multi-tasking environments and programming methodologies for doing so are well known to those of skill in the art and will not be further described herein. It is to be understood that the present invention is not limited to an environment with a single initiator 302 and executor 308 and may beneficially be employed in an environment with three or more interrelated tasks.

The initiator 302 operates on and processes requests retrieved, preferably, sequentially from a work pending queue 304. As an individual request is retrieved from the work pending queue 304, the initiator 302 preferably starts a code thread (string) as appropriate for the received request to perform the necessary operations required by the request. Providing a main initiator task which in turn executes a plurality of strings of code allows the initiator 302 to concurrently process a plurality of requests from work pending queue 304. In addition, the initiator 302 in the illustrated embodiment maintains an entry in the work in process queue 306 for each request currently being operated on by the initiator 302.

The executor 308 has a work queue structure similar to that described for the initiator 302. Requests are preferably retrieved from a work pending queue 310 by a main program thread of the executor 308 which, in turn, initiates execution of a code thread to act on a request from the work pending queue 310 so that a plurality of requests may be concurrently processed. Each in process request is identified by the executor 308 in a work in process queue 312.

The watchdog 300 periodically monitors the initiator 302 and the executor 308 to determine if they are operating properly and to initiate restarts when problems are encountered. The watchdog 300 thereby provides a means for determining if the initiator 302 and the executor 308 tasks are executing properly and restarting these tasks.

As illustrated in the embodiment of FIG. 1, the first device 298 further includes an actual state object 314 and a desired state object 316. The actual state object 314 and the desired state object 316 may be provided as registers or locations in a computer memory device. The memory address locations for the actual state object 314 and the desired state 316 may either be contained within the computer of first device 298 as illustrated in FIG. 1 or located remotely on a shared network device connected to network 290 or on another remote device.

As illustrated by the connecting arrows in the embodiment of FIG. 1, executor 308 is provided with read only (not write access) access to the desired state object 316 and with read and write access to the actual state object 314. In contrast, the initiator 302 is provided with write access to desired state object 316. The initiator 302 may but need not, be provided with read access to both the desired state object 316 and the actual state object 314 but is preferably not provided with write access to the actual state object 314.

Figure 2:
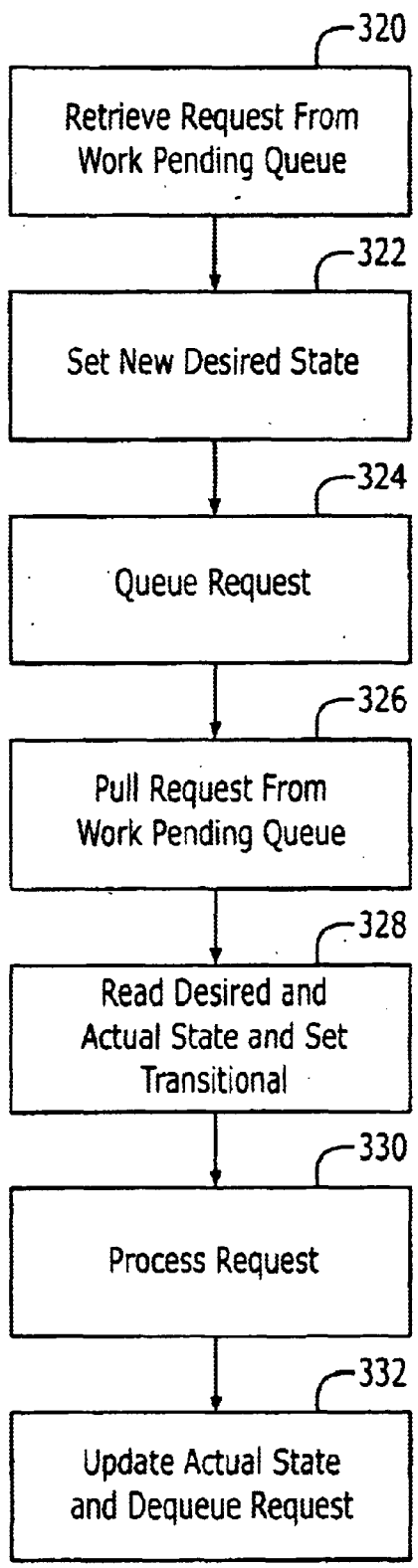
FIG. 2 is a flowchart illustrating operations for coordination of execution for interrelated tasks according to an embodiment of the present invention.

Referring now to the flowchart of FIG. 2, operations for coordination of interrelated tasks according to an embodiment of the present invention will now be described. The initiator 302 retrieves a request from work pending queue 304 and processes the request, for example, by initiating execution of a code thread to process the request (block 320). The request is also then placed in the work in process queue 306 (block 320). The initiator 302 determines a new desired state from its execution of the retrieved request and sets desired state object 316 to the new desired state (block 322). For example, the initiator 302 could receive and process a user request to change the operating mode or condition of a remote device 292, 294, 296. More generally, the initiator 302 processes a request which requires performance of operations by the executor 308 which operations performed by the executor 308 act on the actual state object 314.

It is to be understood that the actual state object 314 may reflect the condition of a variety of devices or process states depending upon the particular application programs and environment in which correlation operations according to the present invention are being applied. For example, the actual state object 314 may reflect the operating mode or condition of a remote device 292, 294, 296.

As noted above, the initiator sets the desired state object 316. The desired state object 316 may include a version designation. Including a version designation allows an individual desired state to reflect a combination of conditions. For example, a desired state could be "steady state" which may actually reflect a plurality of system conditions the combination of which is reflected by the version number. Therefore, implementing the present invention where the desired state reflects both the variable associated with the desired state and a version number can allow greater flexibility in the type of operations that may be performed by the executor 308 to update the actual state object 314. Where the desired state object 316 is provided as having both an associated state and version number, the actual state object 314 preferably similarly has both an associated state and version number. Accordingly, at block 322, the initiator 302 may set the desired state object 316 by setting both the desired state based on the request and incrementing the associated version number by one.

The version number embodiment further may provide for improved performance under conditions where the executor 308 has several unprocessed requests pending, in other words, the version number has been incremented several times to reflect successive changes to the desired state object 316 which changes have not yet been applied to the actual state object 314. Under these conditions, the executor 308 preferably updates the actual state object 314 only if the version number of the actual state object 314 is less than the version number of the desired state object 316. As a result, the first request processed by the executor 308 will update the actual state object 314 to the most current version (highest version number) of the desired state object 316 and the remainder of the pending requests will require no further action.

The initiator 302 then makes a request to the executor 308 by placing a request in work pending queue 310 of executor 308 (block 324). The initiator 302 may then proceed to receive the next request from its work pending queue 304 and continue operations. Alternatively, the initiator 302 may be provided read access to both the desired state object 316 and the actual state object 314 allowing it to note the updates to actual state object 314 and thereby be notified that a requested action has been completed by the executor 308.

The executor 308 retrieves the request from the initiator 302 from its work pending queue 310 (block 326) and, preferably, initiates a code thread to perform operations to implement the request. To carry out the request, the executor 308 first reads the desired state object 316 (block 328). Where a version is used, this operation may be broken into parts wherein the executor 308 first reads the desired version and if the desired version is identical to the version of the actual state object 314 no further action is required to process the request. Accordingly, at block 328, the executor 308 reads both the desired state object 316 and the actual state object 314 to determine if they are different.

Assuming the request from the initiator 302 requires actions by the executor 308 to act upon the actual state object 314, the executor 308 completes the performance of necessary operations to carry out processing of the request (block 330). These operations could include, for example, communicating a request to change state to the desired state to a remote device 292, 294, 296 where the actual state object 314 corresponds to a state of a remote device 292, 294, 296.

Preferably, once the executor 308 initiates operations to update the actual state object 314 to the desired state obtained from the desired state object 316 the executor 308 sets the actual state object 314 to a transitional state. The transitional state may be selected from a plurality of transitional states associated with an update from an actual state to the designated one of a plurality of possible desired states. The transitional state shows that changes are underway but not yet completed which will affect the actual state object 314. Once processing of the request is completed (block 330) the executor 308 updates the actual state object 314 and de-queues the request from its work in process queue 312 (block 332). For example, the executor 308 could receive confirmation of a state change over network 390 from a remote device 292, 294, 296 indicating that the desired state has been received and that the actual state of the remote device 292, 294, 296 has been modified to reflect the desired state. Alternatively, an error indication could be received as a message from a remote device 292, 294, 296 or inferred from the absence of a confirmation within a selected time-out period.

Figure 3:
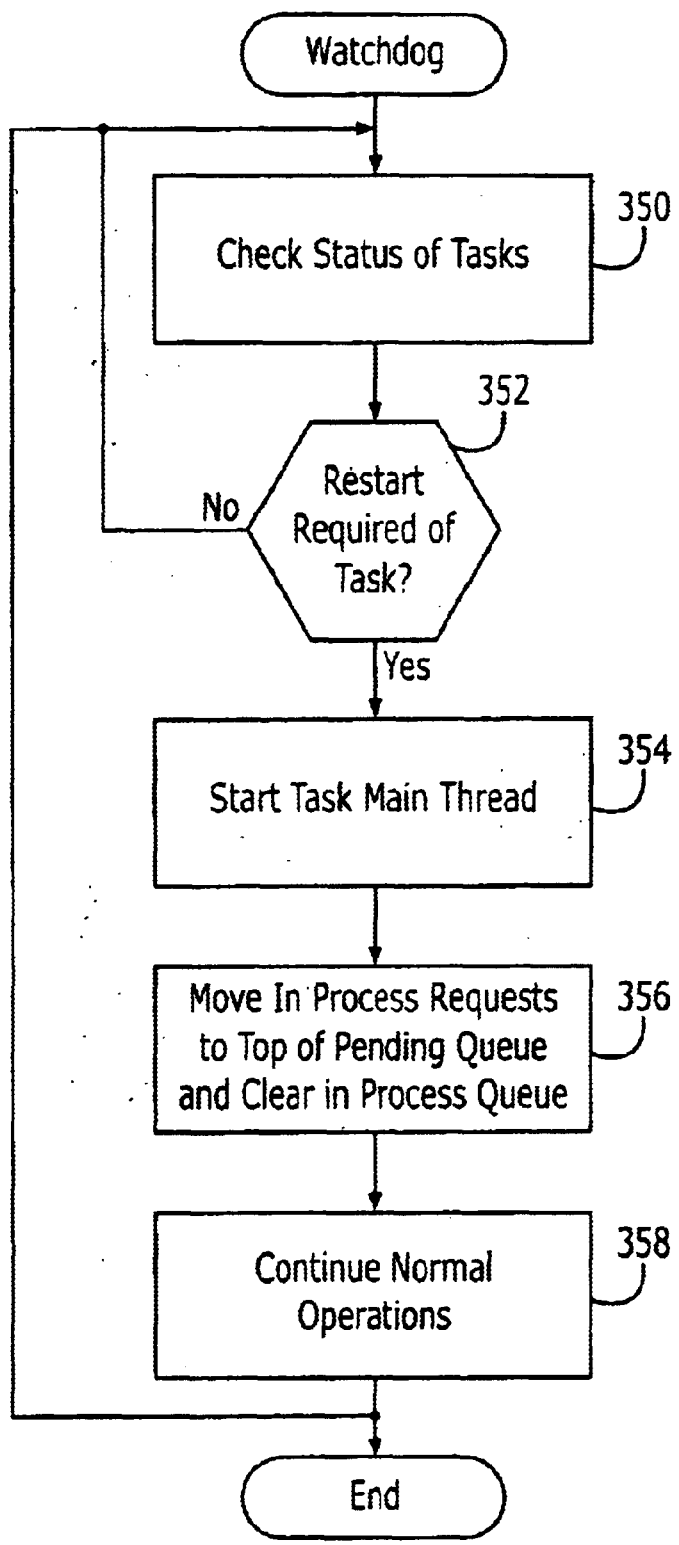
FIG. 3 is a flowchart illustrating operations for a watchdog task restarting a failed task according to an embodiment of the present invention.

Referring now to FIG. 3, operations for the watchdog 300 will now be further described for task monitoring operations according to a further aspect of the present invention. The watchdog 300 periodically audits executing tasks, such as the initiator 302 and/or the executor 308 to determine if they are executing properly (block 350). If all tasks being monitored by the watchdog 300 are executing properly as detected at block 352 operations return to block 350 and the watchdog task 300 waits for the next scheduled time to check on the status of tasks executing on the first device 298. If an error condition is found requiring a restart of a task at block 352, operations move to block 354 and the watchdog task 300 restarts execution of the task which is not executing properly (blocks 354–356). For example, if the initiator 302 is not executing properly the main code thread of the initiator 302 is restarted (block 354). Once the initiator 302 main task is running, the requests contained in its work in process queue 306 are placed in its work pending queue 310 and its work in process queue 306 is cleared (block 356). Normal operations may then continue with the restarted initiator 302 sequentially retrieving the requests that were in process at the time of failure and restarting them as new requests (block 358). Accordingly, successful restarts may be provided without lost requests between the interrelated tasks of the initiator 302 and the executor 308. To support seamless restarts the task (such as initiator 302 or executor 308) is configured to properly execute requests which are terminated in progress and restarted from an initial start point, regardless of the point at which processing of the request has initially terminated.

The work queues 304, 306, 310, 312 will now be further described for a particular embodiment of the present invention. The work pending queues 304, 310 are a list of requests for operations to be performed by the associated tasks 302, 308. The associated tasks 302, 308 have not started performing the operations required by the requests in the work pending queues 304, 310. When a task 302, 308 has available resources to initiate or pass a new request to an idle thread, it selects the next request from its associated work pending queue 304, 310 and moves it to the work in process queue 306, 312. The requests are preferably processed on a first in first out basis.

The tasks 302, 308 are currently performing operations for the requests in their associated the work in process queue 306, 312. A separate code thread is preferably dedicated to each request in the work in process queue 306, 312. Once operations on a request are completed, the request may be moved to a work recently completed queue or deleted. The size of the work in process queue 306, 312 is preferably limited by the maximum number of code threads allowed for each task 302, 308 in this embodiment.

The work queues 304, 306, 310, 312 can allow each task 302, 308 to perform a particular small operation independently of but in coordination with other task. Thus, the entire system of interrelated tasks executing on first device 298 may be broken into multiple processes each performing a particular small operation which, together, implement a more complex operation. This can provide various benefits. For example, as each task 302, 308 performs a small operation, it is possible to create a very robust and reliable implementation of the more complex operation. The more complex a process the more difficult it may be to implement the process in a robust and reliable manner. An environment having individual robust and reliable tasks, generally results in a system that is reliable and robust.

Furthermore, a task 302, 308 can assign a request to perform operations to another task 302, 308. Complex interactions among tasks 302, 308 do not have to be defined. Whenever any task 302, 308 determines that a given operation not within the scope of that task needs to be performed, it transfers a request to another task 302, 308 that supports the required operations. It may, therefore, be easy to update the first device 298 with additional tasks 302, 308 and additional decision points where the need to perform a particular operation is determined and handed off to the appropriate task 302, 308. It is further to be understood that, while operations have been described with respect to an initiator 302 and an executor 308, depending upon the sequence of operations of the overall complex task, any individual task 302, 308 may act as initiator for some operations and as executor for other operations.

By providing the work queues 304, 306, 310, 312 in a persistent database, each task 302, 308 can be terminated normally or abnormally and restarted by watchdog task 300 as described above. This allows the first device 298 to restart individual tasks 302, 308 that terminated abnormally without unnecessarily disrupting operations of other tasks 302, 308 which have not terminated. This may provide for a more robust and reliable system. The work queues 304, 306, 310, 312 further allow a particular task 302, 308 to perform its operations even if another task 302, 308 is not active. This may facilitate debugging of a task 302, 308, as each task 302, 308 may be debugged in a stand-alone environment.

Figure 4:
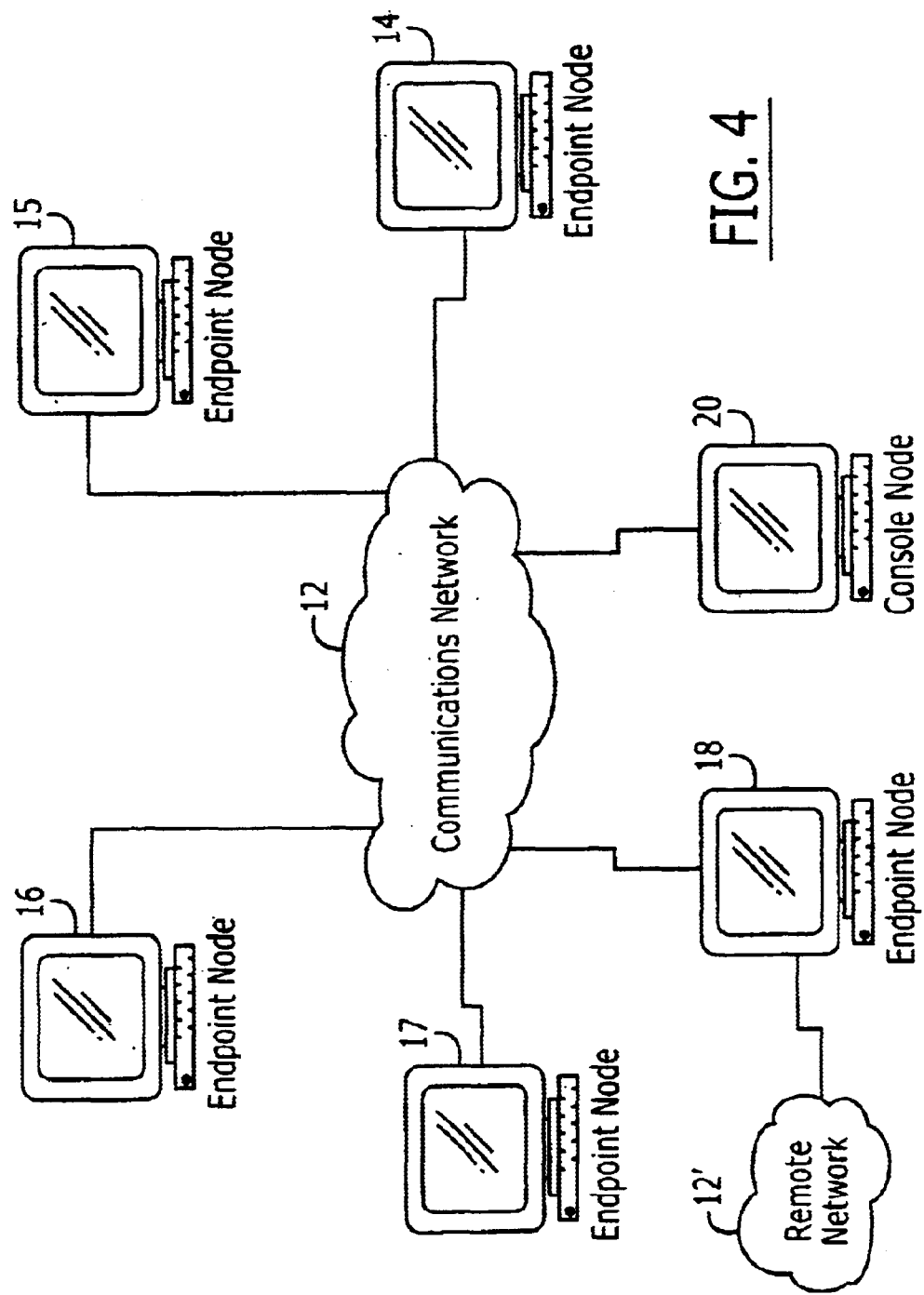
FIG. 4 schematically illustrates a particular network testing hardware and software environment in which the present invention can operate.

Referring now to FIG. 4, a particular hardware and software environment in which the present invention can be applied will now be described. As shown in FIG. 4, the present invention may be applied to systems for testing the performance of a communications network 12. Such a network performance system is further described in U.S. Pat. No. 6,397,359 entitled "Methods, Systems and Computer Program Products for Scheduled Network Performance Testing" which is incorporated by reference herein in its entirety. Communications network 12 provides a communication link between endpoint nodes 14, 15, 16, 17, 18 (corresponding to remote devices 292, 294, 296) and console node 20 (corresponding to first device 298).

As will be understood by those having skill in the art, a communications network 12 may be comprised of a plurality of separate linked physical communication networks which, using a protocol such as the Internet protocol (IP), may appear to be a single seamless communications network to user application programs. For example, as illustrated in FIG. 4, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 4, communications network 12 is shown as a single network it may be comprised of a plurality of separate interconnected physical networks or partitioned sections of a physical network. As illustrated in FIG. 4, endpoint nodes 14, 15, 16, 17, 18 may reside on a computer. As illustrated by endpoint node 18, a single computer hardware system may comprise multiple endpoint nodes. However, for purposes of simplifying the description herein, endpoint nodes and associated hardware will be generally referred to as a unitary element unless referred to otherwise. The system of FIG. 4 tests the performance of communications network 12 by the scheduled execution of test protocols between the various endpoint nodes 14, 15, 16, 17, 18 over communications network 12 using operations according to the present invention to coordinate operations of a plurality of interrelated tasks to implement the overall task of network performance testing.

Figure 5:
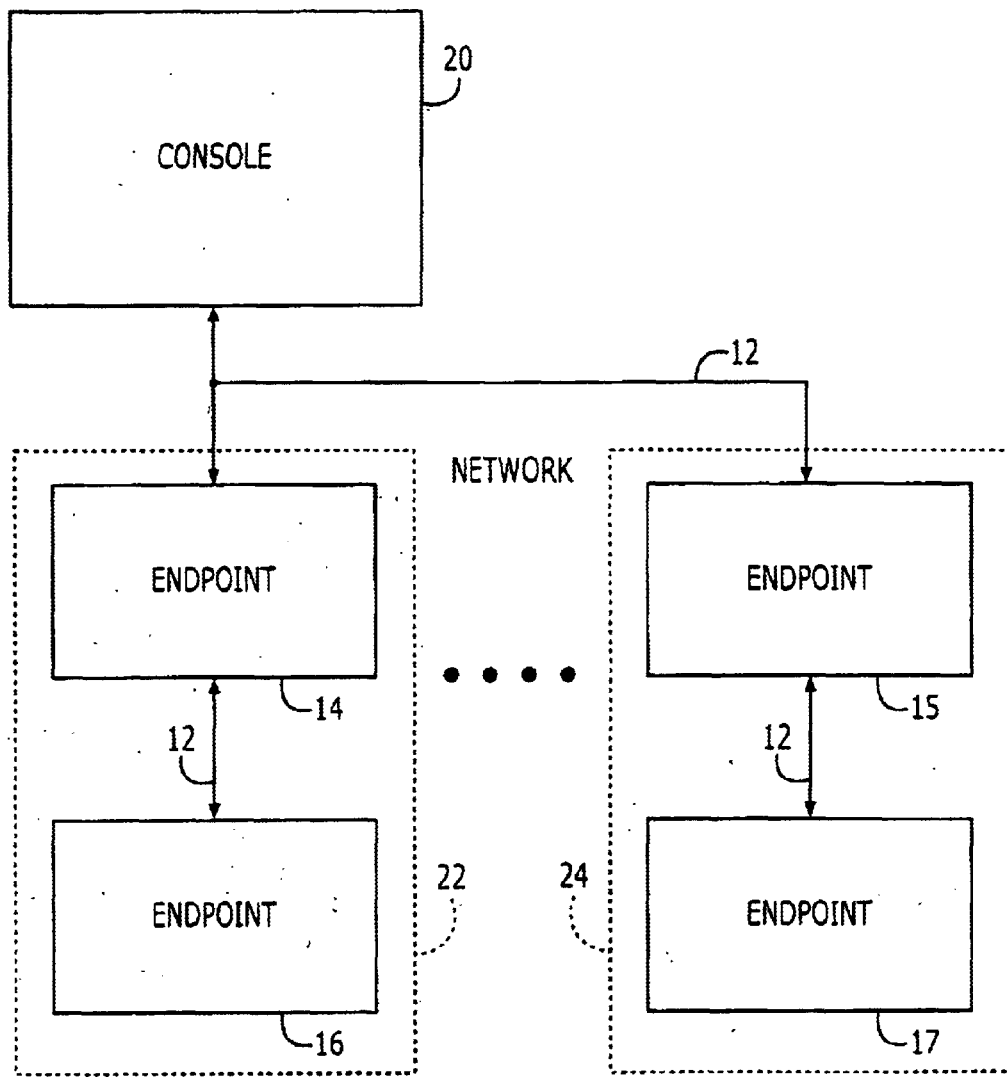
FIG. 5 is a block diagram of an embodiment of the present invention applied to communications network performance testing.

As illustrated in the block diagram of FIG. 5, application communication traffic may be simulated by communications between associated endpoint node pairs 22, 24. As illustrated in FIG. 5, endpoint node 14 and associated endpoint node 16 define a first endpoint node pair 22 associated with a first connection therebetween. Similarly, endpoint node 15 and associated endpoint node 17 define a second endpoint node pair 24 associated with a second connection. While it is preferred that application communication traffic be simulated by endpoint node pairs as illustrated in FIG. 5, it is to be understood that console node 20 may also perform as an endpoint node for purposes of a performance test. It is also to be understood that an endpoint node may be associated with a plurality of additional endpoint nodes to define a plurality of endpoint node pairs each associated with a connection each of which is provided an associated test schedule defining the desired steady state operating condition of the connection on the endpoint node 14, 15, 16, 17, 18.

Console node 20 obtains user input, for example by keyed input to a computer terminal or through a passive monitor, to define connections associated with pairs of endpoint nodes and a test schedule for each connection to test network 12. Console node 20, or other defining means defines a test schedule including a test protocol for the connections to simulate communications traffic between a plurality of selected endpoint nodes 14, 15, 16, 17, 18. Preferably, the test protocol is an endpoint pair based test protocol. Each endpoint node 14, 15, 16, 17, 18 is provided endpoint node information including an endpoint node specific network communication test protocol for the connection and the associated test schedule. The endpoint node information may also include result reporting frequency, connection ID, endpoint 1 requirements, endpoint 2 requirements, threshold critical values and threshold normal values. Preferably, the network communication test protocols are based on a type of application communication traffic expected to provide a test protocol which simulates application communication traffic. Console node 20, or other defining means, defines the connections and the test schedule for each connection including specifying the endpoint nodes associated with the connection and the underlying test protocols. Test protocols contain information about a performance test including what test scripts and network protocol to use for communications between each endpoint pair 22, 24 defining connections. A given test protocol may include a plurality of different test scripts. Examples of test protocols and methods for using test protocols in network performance testing suitable for use with the present invention are described in U.S. Pat. No. 5,838,919 titled "Methods, Systems and Computer Program Products for Endpoint Pair Based Communications Network Performance Testing" which is incorporated herein by reference in its entirety.

A test schedule may be based on a calendar cycle. A different repeat schedule may then be provided for different days. For example, a schedule could initiate execution of a test protocol every 15 minutes from 8 am–12 pm and 1 pm–5 pm on Mondays and Tuesdays and from 8 am–5 pm on Wednesdays and Fridays. The test schedule thereby provides a start time for initiating execution of the test protocol and a repeat schedule for re-initiating execution of the test protocol. The schedule may then be set to expire, for example, after two weeks, unless a new schedule is received.

In one embodiment of the present invention, as illustrated in FIG. 5, a test schedule with endpoint information including an endpoint node specific test protocol including a test script is provided first to a single endpoint node 14, 15 in each endpoint pair 22, 24. Endpoint 1 nodes 14, 15 insure that they can communicate with their respective endpoint node partners 16, 17. The endpoint 1 nodes 14, 15 then communicate an associated partner endpoint node test protocol to their respective endpoint node partners (endpoint 2 nodes) 16, 17. The associated partner endpoint node test protocol may be transmitted each time the test protocol is executed pursuant to the test schedule, thereby treating the endpoint node partners 16, 17 as if they have never previously received the protocol and relieving the endpoint node partners 16, 17 of the need to maintain previously received protocols. Alternatively, network traffic may be reduced by saving the previously transmitted associated partner endpoint node test protocol at the endpoint node partners 16, 17 and transmitting an initiate request to the endpoint node partners 16, 17 when the endpoint 1 nodes 14, 15 determine from the schedule that execution is required.

In a further alternative embodiment, endpoint 1 nodes 14, 15 may determine a corresponding test schedule including a partner endpoint node test protocol from received test schedule and communicate that to endpoint 2 nodes 16, 17. It is to be understood that the partner test schedule including the partner endpoint node test protocol may alternatively be determined and communicated to endpoint 2 nodes 16, 17 from console node 20.

Network performance test results are generally based upon timing measurements. Accordingly, as each endpoint node pair 22, 24 reaches predetermined checkpoints within a script, it creates timing records. The timing records may be returned to console node 20 which may use them to analyze the performance of communications network 12 by calculating statistics. Preferably, the endpoint nodes (or one of each pair) calculate performance test results from the timing measurement and report the calculated results periodically to console node 20. Network performance test results may include throughput, transaction rate and response time.

The test schedules, in addition to providing test protocols, provide a schedule for each connection. The schedule preferably specifies the start time for initiating execution of the associated test protocol and a repeat schedule for re-initiating execution of the associated protocol. An expiration time may also be included for terminating re-execution of the associated test protocol to allow independently operating endpoint notes to age out a schedule to avoid unintended burdening of a network 12 with test traffic. The test schedules of the different connections may, optionally, be coordinated to test particular combinations of test protocols concurrently executing over communication network 12.

As it defines a steady state operating condition for a connection, a new schedule reflects a desired state which, as described previously, may beneficially be associated with a version number. Each time a new schedule is received for a connection, a user interface task increments the version of the desired state and the actual state version number is set to the version number of the desired state if confirmation of delivery of the new schedule to the endpoint node 14, 15, 16, 17, 18 associated with the connection is received. In other words, a connection is a type of object operated on by a plurality of tasks according to the teachings of the present invention.

Console node 20 or other means for analyzing, provides means for analyzing reported network performance test results from endpoint node 14 or other selected reporting endpoint nodes 15, 16, 17, 18 to generate performance measurements. Performance measurements may include throughput and transaction rate. Response time may also be generated as a performance measurement. Alternatively, endpoint node 14, 15, 16, 17, 18 may analyze network data for a connection and provide the performance measurement to console node 20 as the network performance test results.

Console node 20, or other means for detecting communications capabilities, may detect communications capabilities of endpoint node 14, 15, 16, 17, 18 before establishing a connection and a test schedule using endpoint node 14, 15, 16, 17, 18. A pre-setup flow may be sent from console node 20 to each endpoint node 14, 15, 16, 17, 18 identified as part of a connection. The presetup flow may include a requirements list. The requirements list may include a string of bytes which indicate what communications capabilities endpoint node 14, 15, 16, 17, 18 need to support in order to execute their endpoint node specific test protocol under the test schedule. For example, if a test protocol uses Advanced Program to Program Communication (APPC) as the network protocol between an endpoint node pair 22 and the test script involves short connections, the endpoint nodes of endpoint node pair 22 should support the following items which would be in the requirements list: APPC, and Multiple Accept (an optional feature of APPC which allows back-to-back conversations).

Each endpoint node 14, 15, 16, 17, 18 looks at the items in the received requirements list. If it supports these items, it responds positively to the presetup flow. Otherwise, it responds negatively and may return a list of the items it does not support. The returned information may be used by console node 20 for user diagnostics and the definition of a connection may be modified.

Figure 6:
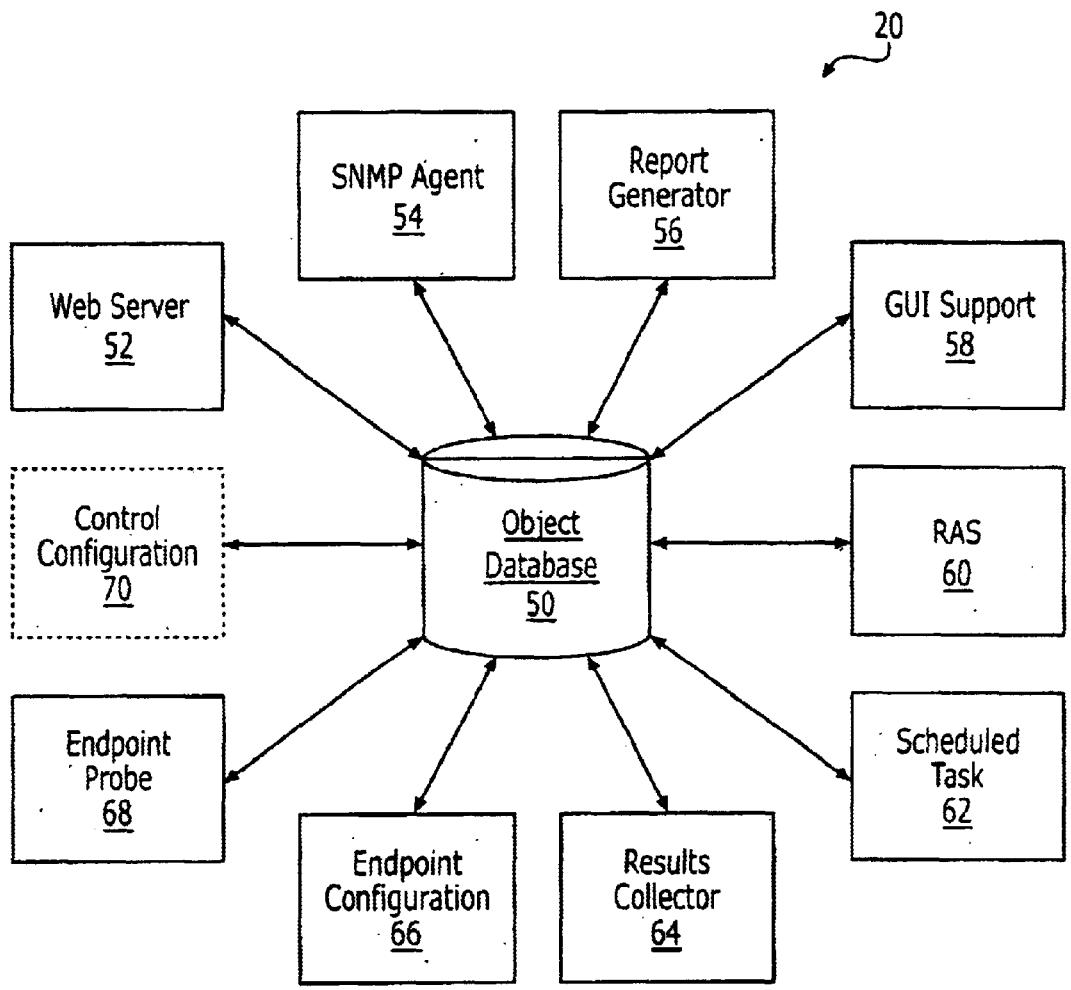
FIG. 6 is a block diagram of an embodiment of the present invention applied to a console node of a communications network performance testing system.

Referring now to FIG. 6, the various modules of a network testing system of console node 20 will be further described. The modules (agents) 52–70 can correspond to tasks of the plurality of interrelated tasks as described with reference to FIG. 1 previously. As shown in FIG. 6, console 20 includes numerous functional blocks (or agents) that may be implemented as separately executed but interrelated code threads, interfacing with object oriented database 50. In general, the various functional blocks will be provided as a console engine executing on the computer hardware in which console node 20 is implemented. However, to simplify the discussion, the engine, node and hardware will generally just be referred to as console node 20 unless otherwise stated. A suitable object oriented database for use with the present invention is the POET™ database available from POET Software Inc. Object oriented database 50 provides storage for configuration data and performance results. Also shown in the embodiment of FIG. 6 is web server 52. Web server 52 provides a communication interface between console node 20 and users (such as a network administrator) for generating reports responsive to user requests. Web server 52 may be provided using a commercially available web servers.

Simple Network Management Protocol (SNMP) agent 54 is responsible for providing control to allow the control node 20 to operate as a SNMP node which may utilize standard interface protocols allowing other network management tools which may be used by a network administrator to interface with the management information base generated by the performance management systems. Preferably, the SNMP agent 54 is established to support read only access to the management information base of object database 50. The SNMP agent 54 may allow access to configuration information related to the endpoints, test results and event reports generated by the network performance system.

Also shown in FIG. 6 is report generator 56. Report generator 56 generates reports responsive to report requests which are either automatically generated for scheduled reports or responsive to specific user requests. Report generator 56 may also provide the capabilities for formatting and printing the reports. A reporting tool suitable for use with the present invention is the Crystal Reports program available from Seagate Software. Preferably, consistent with the use of web browser and Java based techniques according to an illustrated embodiment of the present invention, reports are generated in a Hyper-Text Markup Language (HTML) format.

Also shown in FIG. 6 is GUI (graphical user interface) support agent 58. GUI support agent 58 is responsible for insulating the details of the performance monitoring agents operations on control node 20 from control configuration agent 70. As will be described further, when control configuration agent 70 forwards changes, they are received by GUI support agent 58 from object database 50 and forwarded to the appropriate respective agents of the control node 20 for implementation and processing. In other words, control configuration agent 70 in cooperation with GUI support agent 58 can correspond to initiator 302 (FIG. 1) for operations related to implementing user requested updates. The GUI support agent 58 is responsible for processing modifications, additions or deletions of objects in object database 50 responsive to user inputs from a GUI such as request from a user through control configuration agent 70. GUI support agent 58 both processes changes to the objects for the database 50 and further places appropriate objects into the work queues 304, 310 of other agents (that can correspond to executor 308 (FIG. 1)) illustrated in FIG. 6 as appropriate to implement and track changes to schedules or connections which flow from the user requested changes. It is to be understood that, as used herein, a "work queue" is an ordered list of tasks to be performed by an associated agent.

RAS agent 60 (that can correspond to watchdog 300 (FIG. 1)) is responsible for starting all performance monitoring system processes of console node 20 and monitoring their status. If any process agent fails abnormally, the RAS agent 60 restarts the failed agent. RAS agent 60 provides further reliability, availability and serviceability capability to the systems of the present invention. RAS agent 60 is preferably responsible for starting the other agents illustrated in FIG. 6, monitoring the ongoing operations of the other agents and restarting agents when they fail. RAS agent 60 may also be responsible for generating error message traps if continued failures occur even after restarts. As an additional feature, the RAS agent 60 may provide for restart of all system agents 52–70 illustrated in FIG. 6 on a periodic basis, such as weekly, to reduce error conditions. RAS agent 60 may also initiate full system restarts (i.e. including, for example, the operating system). RAS agent 60 may further provide for generating error messages and/or SNMP traps when disk space for object database 50 goes below minimum levels.

Scheduled task agent 62 is responsible for performing tasks that need to be executed based on a determined schedule. Exemplary tasks performed by scheduled task agent 62 in various embodiments of the present invention include invoking the sending of updated schedules for all active connections on a weekly basis, such as Sunday morning at an early hour when the network is unlikely to be experiencing significant user traffic. Other functions which may be provided by scheduled task agent 62 include generation of schedule periodic reports by submitting requests to report generator 56, computation of daily and monthly result summaries from results stored on object database 50, computation of automatic thresholds and determining if endpoint nodes 14, 15, 16, 17, 18 have failed to contact the console node 20 as expected.

Results collector agent 64 receives test results from endpoint nodes 14, 15, 16, 17, 18. The results may be timing records of a successful test or an indication that a test failed to run. Result collector agent 64 may be implemented as a plurality of threads of code executing on control node 20 to support inbound connections from a plurality of endpoint nodes 14, 15, 16, 17, 18. Different threads can be provided to support different network protocols for various endpoint nodes 14, 15, 16, 17, 18 such as APPC, SPX or TCP. Received results may be parsed and stored in object database 50. In addition, results collector agent 64 may provide for updating of results summaries in object database 50 if results from any connections are untimely received after the summaries for a given period have already been calculated. Different threads may be initiated to support each endpoint node 14, 15, 16, 17, 18 actively transferring results to console node 20. Results collector agent 64 can further provide means to detect errors in data transfers whether from a communication problem or because of errors encountered during the test itself.

In addition, if an endpoint node 14, 15, 16, 17, 18 reports a failure or threshold crossing results collector agent 64 may perform specified actions as appropriate for the reported error condition. Appropriate actions, as will be described later, include sending SNMP traps to other network applications through SNMP agent 54 or executing a command locally on console node 20. A separate threshold crossing thread is provided in results collector 64 to handle processing of input results indicating violation of any threshold criteria by a threshold crossing event.

Endpoint configuration agent 66 is responsible for delivering test schedules to endpoint nodes 14, 15, 16, 17, 18. Related functions may include computing and distributing schedules and updating schedules on a periodic basis. Furthermore, endpoint configuration agent 66 may be responsible for detecting and marking individual endpoint nodes 14, 15, 16, 17, 18 as being in an inoperative condition when an endpoint node 14, 15, 16, 17, 18 cannot be successfully contacted. For example, this may be done after iteratively trying to establish a connection between console node 20 and the endpoint node 14, 15, 16, 17, 18 using each available alternative communication protocol and device address without establishing a successful connection to the individual endpoint node 14, 15, 16, 17, 18. Endpoint configuration agent 66 may also monitor the status of various endpoint nodes 14, 15, 16, 17, 18 by computing a reporting period for each endpoint node 14, 15, 16, 17, 18 based on the test schedules and placing appropriate information in object database 50 to indicate to other agents when network performance test results should be expected from particular endpoint nodes 14, 15, 16, 17, 18 and associated connections. Endpoint configuration agent 66 may further detect and report when an endpoint pair 22, 24 is invalid if an individual one of the endpoint pair 22, 24 reports in with an indication that it is unable to establish a connection with its established endpoint pair for a particular connection.

Endpoint probe agent 68 is responsible for contacting endpoint nodes 14, 15, 16, 17, 18 that are in an inoperative condition. Endpoint probe agent 68 periodically attempts to contact inoperative endpoint nodes 14, 15, 16, 17, 18 until they can be reached or removed from object database 50 as an active endpoint node 14, 15, 16, 17, 18. Endpoint probe agent 68 may also be provided the capability to automatically assess configuration information about prospective endpoint nodes 14, 15, 16, 17, 18, such as protocols supported, addresses, operating systems and so on, when new endpoint nodes 14, 15, 16, 17, 18 are identified and added to object database 50. Endpoint probe agent 68 further may periodically attempt to contact inoperative endpoint nodes 14, 15, 16, 17, 18 until they can be returned to an active condition.

As described with endpoint configuration information collection, endpoint probe agent 68 preferably attempts to establish contact with inoperative endpoint nodes 14, 15, 16, 17, 18 using all available known communication protocols and addresses. Once an endpoint node 14, 15, 16, 17, 18 is successfully contacted, endpoint probe agent 68 retrieves the endpoint configuration information and updates object database 50 to establish that it is no longer an inoperative endpoint node 14, 15, 16, 17, 18. Preferably, the frequency of attempts to contact an inoperative endpoint node 14, 15, 16, 17, 18 goes down the longer an endpoint node 14, 15, 16, 17, 18 stays inoperative. However, it is preferred that endpoint probe agent 68 attempt to contact any inoperative endpoint nodes 14, 15, 16, 17, 18 at least one time per day. As with various of the other agents of FIG. 6 discussed herein, endpoint probe agent 68 may be provided with the capability to perform actions, such as SNMP traps or executing a command, responsive to conditions, such as an inoperative endpoint node 14, 15, 16, 17, 18.

Also shown in FIG. 6 is control configuration agent 70. As illustrated by the dotted line used for control configuration agent 70 in FIG. 6, it is preferred that this agent be executed remotely from the system on which object database 50 resides. This allows the actual database hardware of console node 20 to be placed in a secure area with remote user access to change system parameters. Preferably, control configuration agent 70 is provided as a Java application executing on a remote device in communication with console node 20. As will be described more fully herein with respect to the operations of the present invention, the control configuration agent 70 can provide for input of configuration information for various aspects of test operations according to the present invention such as definition of endpoints and endpoint pairs, thresholds, actions, schedules, test scripts, department and location definitions, security protocols, reporting procedures, SNMP definition, system defaults and user defaults. Control configuration agent 70 further may provide for input of status change requests with respect to various endpoint nodes 14, 15, 16, 17, 18 or endpoint pairs 22, 24 such as taking a particular endpoint node 14, 15, 16, 17, 18 off of active status.

While illustrated in FIG. 6 as connected directly to object database 50, changes to the object database 50 may not be directly implemented by control configuration agent 70. Rather, GUI support agent 58 can provide an interface allowing changes to be implemented based on requests from control configuration agent 70, on an asynchronous basis, as various other agents perform their associated functions to change the status of devices and protocols within the network performance test schedules. Accordingly, the direct connection of control configuration agent 70 to object database 50 illustrates the placement of information on the database which may then be retrieved by GUI support agent 58 for processing and implementation. The approach provided for handling the asynchronous state transitions between requested changes and implementation of the changes across the affected nodes of the computer network 12 is through the systems, methods and computer program products of an embodiment of the present invention.

The various agents illustrated in FIG. 6 may generally be referred to as the console engine of the network performance system. As described with respect to FIG. 6, however, the console engine executing on console node 20 is preferably implemented as a variety of code threads independently executing and performing different functions through coordinated usage of object database 50 according to the teachings of the present invention. Similarly, an endpoint engine is provided and executed on each of the devices supporting endpoint nodes 14, 15, 16, 17, 18 to implement the endpoint node functions. Endpoint nodes 14, 15, 16, 17, 18 suitable for use with the present invention, as noted above, are described in U.S. Pat. No. 5,838,919. However, unlike the endpoint engines described in the '919 patent, the endpoint engines of the present invention are not required to operate in a synchronized manner across a plurality of endpoint pairs carrying out a test scenario simultaneously. Instead, endpoint engines according to the present invention can provide for independent scheduling and initiation of test protocols responsive to a test schedule provided to the endpoint engines from the control node engine of FIG. 6. Therefore, the particular information processing by an endpoint engine according to the present invention may vary from that disclosed in the '919 patent.

Endpoint engines executing on endpoint nodes 14, 15, 16, 17, 18 respectively receive test schedules and store the received test schedules in memory available to endpoint nodes 14, 15, 16, 17, 18. They further initiate execution of tests based on the stored schedules, monitor performance during the tests and collect results from the tests. The results are stored until the appropriate time for a batch or event driven reporting of results to control node 20. In addition, as will be described further herein, endpoint engines of the present invention preferably generate and calculate network performance results locally from measurements during tests and further provide for comparison of the calculated network performance results to threshold criteria value. The endpoint engine on endpoint nodes 14, 15, 16, 17, 18 is further responsible for reporting endpoint configuration information responsive to requests from control node 20 and for performing pre-setup and setup operations between respective endpoint nodes 14, 15, 16, 17, 18 defining an endpoint node pair for a particular connection. Endpoint engines according to the present invention otherwise may provide capabilities in a manner described in the '919 patent. In any event, as noted previously, for simplicity, endpoint engines will not generally be distinguished from endpoint nodes 14, 15, 16, 17, 18 herein.

Figure 7:
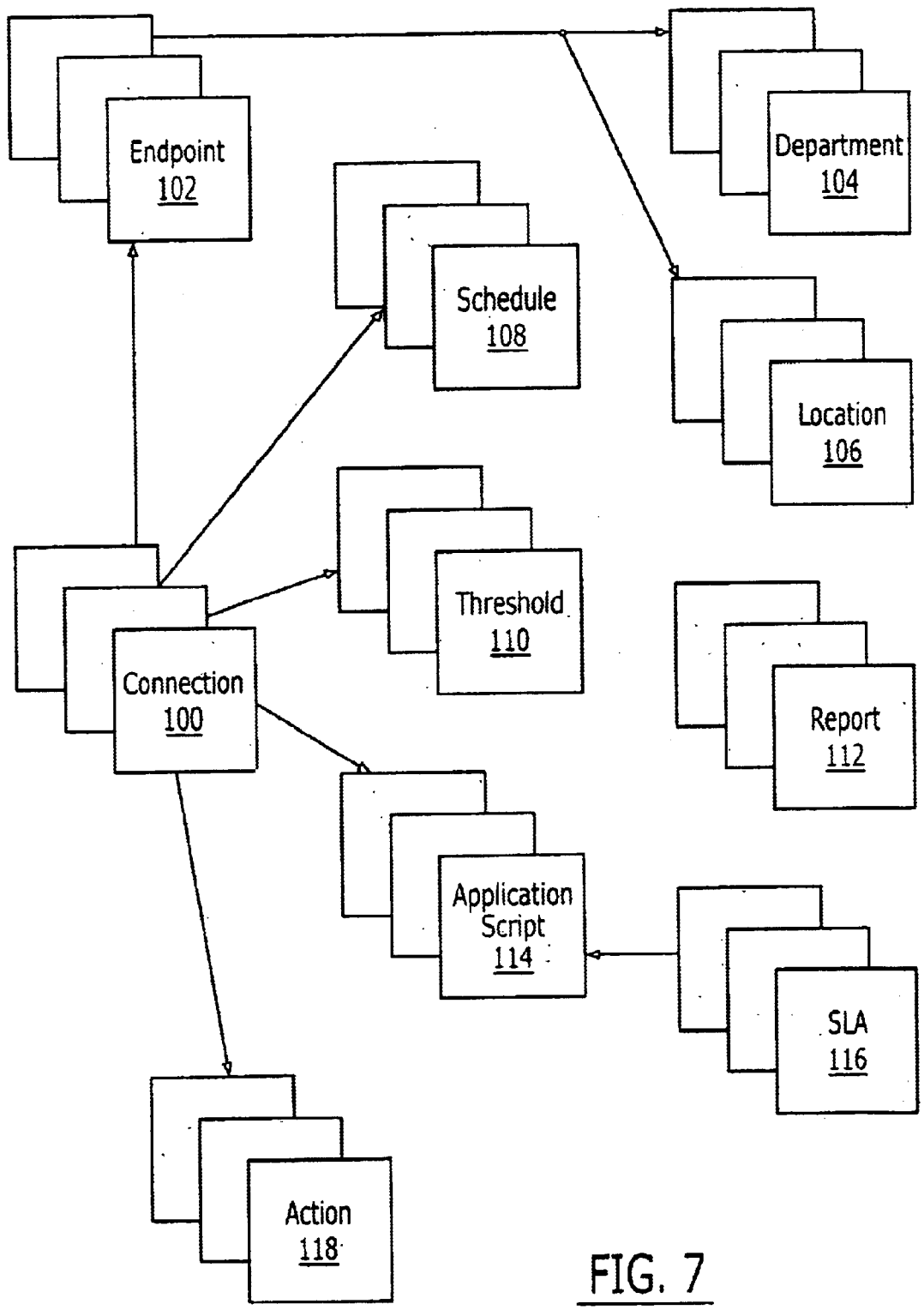
FIG. 7 is an illustration of entity types and relationships according to an embodiment of the present invention applied to communications network performance testing.

Referring now to FIG. 7, the relationship and characteristics of the various objects in object database 50 will now be further described for the illustrated embodiment of the present invention. The different object types will be referred to herein as named entities or named entity types. Each of the various named entities illustrated in FIG. 7 may be configured by a user through control configuration agent 70. Referring first to connection entity 100, connections refer to the point to point communication link which will be tested using various test protocols. Each connection entity 100 may include a variety of associated information including endpoint one, endpoint two, schedule, threshold, application script, threshold action and connection action. Each of the associated values for a connection entity 100 may be a pointer to another named entity contained in object database 50.

As shown in FIG. 7, a plurality of connection entities 100 may be maintained in object database 50. The endpoint one and endpoint two values contained for a given connection entity 100 refer to specific endpoint named entities 102 in object database 50. Each endpoint entity 102 represents an installed instance of an endpoint engine program on one of the endpoint nodes 14, 15, 16, 17, 18 connected to the network 12 to be tested. Any individual endpoint entity 102 may support multiple communication protocols and addresses, such as Internet addresses. The limitations on an individual endpoint entity 102 may depend upon the hardware characteristics of the associated endpoint node device 14, 15, 16, 17, 18. As noted above, it is to be understood that any given endpoint hardware device may support a plurality of endpoint nodes 14, 15, 16, 17, 18 on the network 12. Furthermore, depending upon installed hardware, the various endpoint nodes 14, 15, 16, 17, 18 active on a given hardware device may support different communication protocols and be associated with different addresses, such as Internet addresses. Accordingly, an endpoint entity 102 is preferably provided in object database 50 for each active endpoint node 14, 15, 16, 17, 18 on the network 12.

As noted, each connection entity 100 will be associated with two different endpoint entities 102. Furthermore, any individual endpoint entity 102 may be associated with more than one connection entity 100. Each endpoint entity 102 may, in turn, be associated with a department entity 104 and a location entity 106. The department entity 104 and location entity 106 can provide for discrimination between endpoints based upon criteria established by the network administrator.

The schedule entities 108 define time periods during the week and a repeat interval when the associated connection entities 100 should be monitored. Schedules may be provided allowing for weekly, monthly or other repeat periods including specification of individual days, such as holidays, which are exceptions to the periodic repeat schedule. Each connection entity 100 is associated with one schedule entity 108. However, any given schedule entity 108 may be associated with a plurality of connection entities 100.

Threshold entities 110 are also illustrated in the embodiment of FIG. 7 and are associated with a thresholding aspect of the network performance testing. Each threshold entity 110 represents a desired performance level standard/criteria. Each connection entity 100 may be associated with one or more threshold entities 110. For example, separate threshold entities 110, both associated with a single connection entity 100, may be provided for fixed and auto thresholds. Any given threshold entity 110 may be associated with a plurality of connection entities 100. Furthermore, as will be described further herein, a threshold 110 may specify an automatic or fixed threshold.

Application script entities 114 represent the network flows of a test protocol to be implemented under the test schedule at specified times between the endpoint nodes 14, 15, 16, 17, 18 specified by an associated connection entity 100. Exemplary application scripts suitable for use in testing a connection entity 100 are further described in the '919 patent. An application script entity 114 may be associated with a plurality of different connection entities 100. Typically, an individual connection entity 100 will be associated with a single application script entity 114 but may be associated with more.

An SLA entity 116 represents a service level agreement. A system user can define network performance and availability service level agreements (SLA) for use in reporting performance. Generated reports may then be configured to report results against the configured service level agreement entities 116 and the specified performance parameter levels in the SLA. The report entities type 112 can contain user configured parameters defining reports available for generation to a printer and/or to a user requesting information through web server 52 in an HTML format.

Various measurements of network performance may be provided. Available measurements may include up-time (measurement of percentage of time that a network connection was operational over a given period of time), error rate (measurement of the number of errors relative to total transactions for a specific connection over a given period of time), response time (measurement of time interval it takes for two endpoints to complete a given operation) and throughput (measurement of quantities of data carried between two endpoints minus the protocol overhead over a given period of time). Measured data may also be provided in a format suitable for deriving various performance measures such as running average response time (average of all response time measures for a given object), rolling average of response time (average of the previous N response time measures for a given object, where N is a constant) and threshold distance (the distance to and from a given threshold in terms of percentage of threshold value).

In a further aspect of network performance testing, responsive actions are supported as defined by action entities 118. An action entity 118 is executed when the associated condition occurs. An action will typically include one of two operation types. First, an SNMP trap may be initiated and sent through SNMP agent 54 to a remote application for responsive action. For example, known network programs are available which trigger a page to a network support operator when network performance conditions fall below a specified level. The present invention may be used to trigger a network error condition based upon the performance measurements from the present invention with an SNMP trap passed to the user's existing alarm system to page the appropriate network operator to take corrective action. Alternatively, an action entity 118 may specify execution of a command on console node 20. For example, when an external alarm system is available to a user, a modem can be installed on console node 20 and a program may be executed which automatically dials a pager for the network operator responsive to a detected condition on the network 12.

In addition to supporting database objects for system configuration and operation as illustrated in connection with FIGS. 6 and 7, object database 50 further provides for storage of results. Performance results using the present invention may generally be grouped and reported as performance and/or connection analysis. For a performance analysis of the network 12, an exemplary format for results storage in object database 50 is illustrated in Table 1.

TABLE 1

Performance Results

| Name | Description |
|---|---|
| Failure Cause | Provides failure information if the test failed. |
| Transaction_count | The number of transactions run as a part of the test. |
| Total_bytes | The total number of bytes that were sent and received. |
| Total_time | The total amount of time taken to run the test. |
| Is_above_threshold | Indicates if the run was above threshold. |
| Run_time | The date and time when the test was run. |

For each threshold crossing (i.e., a measurement failing a specified criteria or returning to a normal condition), the following is kept in the object database 50 as shown in Table 2:

TABLE 2

Threshold Crossing Data

| Name | Description |
| --- | --- |
| Critical_time | The date and time when the normal to critical crossing took place. |
| normal_time | The date and time when the critical to normal crossing took place. |
| threshold_value | The result value that caused the crossing. |
| critical_value | The value of the threshold. |
| max_crossing_distance | The max distance of runs during the crossing from the Critical Value. |
| avg_crossing_distance | The average distance of the runs from the Critical Value. |
| tests_above_threshold | The number of tests that were above the threshold. |

For report generation, it is preferred that object oriented database 50 export the performance results to a relational database, such as the Access database available from Microsoft Corporation. Offloading the results for report preparation improves performance as the object oriented database 50 typically will contain a very large number of performance results and provides a less efficient interface to the reporting package for accessing such results. Preferably, an interface is provided for using Access related tools provided with the object oriented database to extract the results and place them in a .MDB type database suitable for use with Access. This approach may be used for reporting out a performance analysis and also for reporting out a connection analyses.

In addition to performance reports in connection with analysis reports, periodic reports may beneficially be generated based on data acquired by the present invention. For example, a 24 hour period periodic report could be generated by placing the following information in the relational database (.MDB) format.

As should be apparent from the preceding discussion, the network performance testing system shown in FIGS. 4–7 can provide for independent execution of operations by endpoint nodes 14, 15, 16, 17, 18 based on test schedules 108 received from a console node 20 which are subject to change at any time by a user interfacing with console node 20 through control configuration agent 70.

Therefore, operations are provided according to an embodiment of the present invention for maintaining the integrity of the object database 50 which operations are capable of handling transitional periods in which the desired state of an endpoint node 14, 15, 16, 17, 18 is not aligned with the actual state. Coordination of interrelated tasks 52–70 is provided according to an embodiment of the present invention based upon separately tracking in the object database 50 the actual and desired states of each connection 100 as actual state object 314 and desired state object 316 respectively. The respective and actual desired states for each connection 100 for the illustrated embodiment of the present invention are shown in Table 3.

TABLE 3

Connection states

| State | Description |
| --- | --- |
| Actual States | |
| Uninitialized | Schedule for the connection has not yet been delivered to the endpoint. |
| SteadyState | The connection is running. |
| NewScheduleNeeded | Changes were made to the configuration that require a new schedule to be sent for the connection. |
| DeliveringSchedule | The schedule for this connection is in the process of being delivered. |
| PendingDelete | User has requested that the connection be deleted. The endpoint needs to be contacted to delete the connection. |
| Deleted | The endpoint for the connection has been contacted and the connection has been deleted. |
| PendingDisabled | User has requested that the connection be disabled. The endpoint needs to be contacted to disable the connection. |
| Disabled | The endpoint for the connection has been contacted and the connection has been disabled. |
| Error | The connection has failed to run due to a problem with the configuration. |
| Desired States | |
| MSEnabled | The connection has been enabled by the user. |
| MSDisabled | The connection has been disabled by the user. |
| MSDeleted | The connection has been deleted by the user. |

As can be seen from the descriptions provided of the various states in Table 3, the present invention can maintain the integrity of the connection named entities 100 in the object database 50 in a manner which can accommodate requests for modifications to a connection state while recognizing that the actual implementation of that state through communications with the associated endpoint nodes 14, 15, 16, 17, 18 for the connection 100 requires some time. As a result, test schedules 108 may be implemented according to the present invention while still allowing asynchronous input of updated test schedules by users without violating the integrity of the object database 50 or causing errors in the execution of the test schedules 108.

Various of the states in Table 3 may have associated version numbers. In particular, "SteadyState" has an associated version number for each new or updated schedule 108 input for a connection 100. Other of the states are transitional states including "NewScheduleNeeded" and "Delivering Schedule" which are associated with a transition from a first "SteadyState" to a new version number "SteadyState." Similarly, "PendingDelete" and "PendingDisabled" are associated with a transition to a deleted or disabled state respectively. While in a transitional state awaiting confirmation of completion of a change to a new desired state, various operations on a connection 100 can be blocked out while others may still be allowed. For example, reports could be accepted from a connection 100 in a "PendingDisabled" state but new schedules may not be accepted unless the connection 100 is first enabled.

As noted in the discussion above, tasks executed by the various agents illustrated in FIG. 6 are interrelated. In that regard, there have been references to the use of work queues 304, 306, 310, 312 to coordinate operations between the various agents 52–70 shown in FIG. 6. To further illustrate the use of work queues 304, 306, 310, 312 in coordinating operations of the various agents 52–70 at console node 20, the following exemplary work queues 304, 306, 310, 312 illustrate the type of object/entities, the source of the object/entity and the conditions triggering entry of the object/entity into the work queues for the respective agents:

GUI Support Agent 58

| Type | Source | Condition |
|---|---|---|
| Endpoint | control configuration interface 70 | User invokes verify on an Endpoint. |
| Connection | control configuration interface 70 | User adds, modifies, deletes, enables, disables, or verifies a connection. |
| Output Schedule | control configuration interface 70 | When a schedule is modified by the user. |
| Protocol Options | control configuration interface 70 | When protocol options are modified by the user. |
| Report | control configuration interface 70 | User adds, modifies, deletes, or requests an immediate generation of a report. |
| Report Template | control configuration interface 70 | A report template is added, deleted, or modified in the database. |
| Schedule | control configuration interface 70 | When a schedule is modified by the user. |
| Script | control configuration interface 70 | When a script is modified by the user. |
| System Info | control configuration interface 70 | When system options are modified by the user. |
| Threshold | control configuration interface 70 | When a threshold is modified by the user. |

Endpoint Probe Agent 68

| Type | Source | Condition |
|---|---|---|
| Endpoint | scheduled task agent 62 | Scheduled task agent 62 wakes up to ensure that the server has heard from the endpoint in within the expected time. If the endpoint has not contacted the server within the expected time, the endpoint is moved to Probe agent 68's work queue. |
| | endpoint Config | Endpoint Config attempts to deliver a schedule to the endpoint. If it fails to contact the endpoint, the endpoint is moved to Probe Agent 68's work queue. |
| | GUI Support agent 58 | When a verify on an endpoint is requested. |

Endpoint Configuration Agent 66

| Type | Source | Condition |
|---|---|---|
| Endpoint | GUI Support agent 58 | Property of a connection with the given endpoint as endpoint is changed. Verify on a connection is requested. |
| | Probe agent 68 | The endpoint is now reachable and a new schedule needs to be delivered to it. |
| | scheduled task agent 62 | Scheduled task agent 62 wakes up Sunday morning at 1:30 an places all endpoints in the endpoint Config's work queue to update the schedules at the endpoints. Whenever scheduled task agent 62 recomputes the auto threshold value of a connection on a day other than Sunday, it places the corresponding endpoint on endpoint Config's work queue. |

Scheduled Task Agent 62

| Type | Source | Condition |
|---|---|---|
| Report | GUI Support agent 58 | GUI Support agent 58 process a Report or a Report Template in its work queue. |

FIGS. 1–7 above are flowchart and block diagram illustrations of methods, apparatus (systems) and computer program products according to the invention. It will be understood that each block of the illustrations, and combinations of blocks in the illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Accordingly, blocks of the illustrations support combinations of means for performing the specified functions, combinations of steps for performing the specified functions and program instruction means for performing the specified functions. It will also be understood that each block of the illustrations, and combinations of blocks in the illustrations, can be implemented by special purpose hardware-based computer systems which perform the specified functions or steps, or combinations of special purpose hardware and computer instructions.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for coordination of operations for a plurality of interrelated tasks comprising the steps of:

setting a desired state object to a desired state;

requesting an update of an actual state object to the desired state; and updating the actual state object responsive to the request to update the actual state object;

wherein the step of setting the desired state object and the step of requesting an update of the actual state object are performed by a first one of the plurality of interrelated tasks having write access to the desired state object and not having write access to the actual state object; and wherein the step of updating the actual state object is performed by a second one of the plurality of interrelated tasks having write access to the actual state object and not having write access to the desired state object.

2. A method according to claim 1 wherein the desired state object and the actual state object each have an associated version number and wherein the step of updating the actual state object comprises the steps of:

receiving the request to update the actual state object to the desired state;

reading the version number of the actual state object and the version number of the desired state object; and setting the actual state object to the desired state if the version number of the actual state object is different from the version number of the desired state object.

3. A method according to claim 2 wherein the step of setting the actual state object further comprises the step of incrementing the version number of the actual state object to the version number of the desired state object.

4. A method according to claim 3 wherein the step of setting the actual state object comprises the step of setting the actual state object to the desired state if the version number of the actual state object is less than the version number of the desired state object.

5. A method according to claim 1 wherein the step of updating the actual state object comprises the steps of:

receiving the request to update the actual state object to the desired state;

reading the actual state object and the desired state object; and setting the actual state object to the desired state.

6. A method according to claim 5 wherein the step of setting the actual state object comprises the steps of:

setting the actual state object to a transitional state; then performing operations associated with changing from the actual state to the desired state; and then setting the actual state object to the desired state.

7. A method according to claim 6 wherein the first and second ones of the plurality of interrelated tasks are executing on a data processing system and wherein the step of performing operations comprises the steps of:

communicating a request to change state to the desired state to a second device remote from the data processing system; and receiving at least one of an error indication and a confirmation of state change from the second device; and wherein the step of setting the actual state to the desired state comprises the step of setting the actual state to the desired state if a confirmation of state change is received from the remote device.

8. A method according to claim 1 wherein the step of requesting an update of an actual state object to the desired state comprises the step of placing a request in a work pending queue associated with the second one of the plurality of interrelated tasks.

9. A system for coordination of operations for a plurality of interrelated tasks comprising:

a desired state object;

an actual state object;

a first one of the plurality of interrelated tasks having write access to the desired state object and not having write access to the actual state object, the first one of the plurality of interrelated tasks comprising:

means for setting the desired state object to a desired state; and means for requesting an update of the actual state object to the desired state; and a second one of the plurality of interrelated tasks having write access to the actual state object and not having write access to the desired state object, the second one of the plurality of interrelated tasks comprising:

means for updating the actual state object responsive to the request to update the actual state object.

10. A system according to claim 9 wherein the desired state object and the actual state object are separate memory locations communicatively coupled to a computer and wherein the first one and the second one of the plurality of interrelated tasks execute on the computer.

11. A computer program product for coordination of operations for a plurality of interrelated tasks using a desired state object and an actual state object, comprising:

a computer-readable storage medium having computer-readable program code means embodied in said medium, said computer-readable program code means comprising:

computer-readable program code means having write access to the desired state object and not having write access to the actual state object for setting the desired state object to a desired state and for requesting an update of the actual state object to the desired state; and computer-readable program code means, having write access to the actual state object and not having write access to the desired state object, for updating the actual state object responsive to the computer-readable code means for setting the desired state object to a desired state and for requesting an update.

12. A method for coordination of operations for a plurality of interrelated tasks operating on a shared resource comprising:

the following performed by a first one of the plurality of interrelated tasks:

setting a desired state object associated with the shared resource to a desired state of the shared resource to request a change in state of the shared resource; and the following performed by a second one of the plurality of interrelated tasks:

reading the desired state object;

determining if a current state of the shared resource is different from the desired state;

initiating performing operations associated with changing the current state of the shared resource to the desired state; and setting an actual state object associated with the shared resource to the desired state.

13. A method according to claim 12 wherein setting an actual state object comprises:

setting the actual state object to a transitional state associated with an update from the current state to one of a plurality of possible desired states designated by the desired state object, the transitional state being selected from a plurality of possible transitional states associated with different updates; and setting the actual state object to the desired state upon receiving confirmation of a state change of the shared resource to the desired state.

14. A method according to claim 13 wherein the step of initiating performing operations comprises the steps of:

communicating a request to change state to the desired state to a remote device; and receiving at least one of an error indication and a confirmation of state change from the remote device; and wherein the step of setting the actual state object to the desired state upon receiving confirmation of a state change of the shared resource comprises the step of setting the actual state object to the desired state if a confirmation of state change is received from the remote device.

15. A method according to claim 13 wherein the desired state object and the actual state object each have an associated version number and wherein the step of setting the actual state object comprises:

reading the version number of the actual state object and the version number of the desired state object; and setting the actual state object to the desired state if the version number of the actual state object is different from the version number of the desired state object.

16. A system for coordination of operations for a plurality of interrelated tasks operating on a shared resource comprising:

a first one of the plurality of interrelated tasks comprising means for setting a desired state object associated with the shared resource to a desired state of the shared resource to request a change in state of the shared resource; and a second one of the plurality of interrelated tasks comprising:

means for reading the desired state object;

means for determining if a current state of the shared resource is different from the desired state;

means for initiating performing operations associated with changing the current state of the shared resource to the desired state; and means for setting an actual state object associated with the shared resource to the desired state.

17. A computer program product for coordination of operations for a plurality of interrelated tasks operating on a shared resource, the plurality of interrelated tasks executing on a computer, comprising:

a computer-readable storage medium having computer-readable program code means embodied in said medium, said computer-readable program code means comprising:

computer-readable program code means of a first one of the plurality of interrelated tasks that sets a desired state object associated with the shared resource to a desired state of the device to request a change in state of the shared resource; and computer-readable program code means of a second one of the plurality of interrelated tasks that:

reads the desired state object;

determines if a current state of the shared resource is different from the desired state;

initiates performing operations associated with changing the current state of the shared resource to the desired state; and sets an actual state object associated with the shared resource to the desired state.

* * * * *